United States Patent [19]

Mihram et al.

[11] 3,873,362
[45] Mar. 25, 1975

[54] PROCESS FOR CLEANING RADIOACTIVELY CONTAMINATED METAL SURFACES

[75] Inventors: Russell G. Mihram; Gerald A. Snyder, both of Duncan, Okla.

[73] Assignee: Halliburton Company, Duncan, Okla.

[22] Filed: May 29, 1973

[21] Appl. No.: 364,383

[52] U.S. Cl.......................... 134/3, 134/13, 134/26, 134/28, 134/29, 134/41, 252/95, 252/103, 252/142, 252/147, 252/149, 252/DIG. 11, 252/301.1 W
[51] Int. Cl........................... C23g 1/08, C23g 1/20
[58] Field of Search........... 134/3, 41, 27, 28, 2, 13, 134/26, 29; 252/95, 103, 142, 147, 149, DIG. 11, 301.1 W

[56] References Cited
UNITED STATES PATENTS

| | | | |
|---|---|---|---|
| 3,000,829 | 9/1961 | Arden | 134/27 X |
| 3,013,909 | 12/1961 | Pancer et al. | 134/27 X |
| 3,013,978 | 12/1961 | Rosinski | 252/301.1 W |
| 3,080,262 | 3/1963 | Newman | 134/3 |
| 3,080,323 | 4/1963 | Newman | 134/29 X |
| 3,438,811 | 4/1969 | Harriman et al. | 134/2 |
| 3,481,882 | 12/1969 | Streicher | 134/3 X |
| 3,496,017 | 2/1970 | Weed | 134/41 X |
| 3,615,817 | 10/1971 | Jordan et al. | 134/41 X |

*Primary Examiner*—S. Leon Bashore
*Assistant Examiner*—Richard H. Tushin
*Attorney, Agent, or Firm*—Thomas R. Weaver; William R. Laney; John H. Tregoning

[57] ABSTRACT

A process for removing radioactive scale from a ferrous metal surface, including the steps of initially preconditioning the surface by contacting it with an oxidizing solution (such as an aqueous solution of an alkali metal permanganate or hydrogen peroxide), then, after removal or decomposition of the oxidizing solution, the metallic surface is contacted with a cleaning solution which is a mixture of a mineral acid and a complexing agent (such as sulfuric acid and oxalic acid), and which preferably contains a corrosion inhibitor. A final step in the process is the treatment of the spent cleaning solution containing radioactive waste materials in solution by adding a reagent selected from the group consisting of calcium hydroxide or potassium permanganate and an alkali metal hydroxide to thereby form easily recovered metallic compounds containing substantially all of the dissolved metals and radioactivity.

27 Claims, 1 Drawing Figure

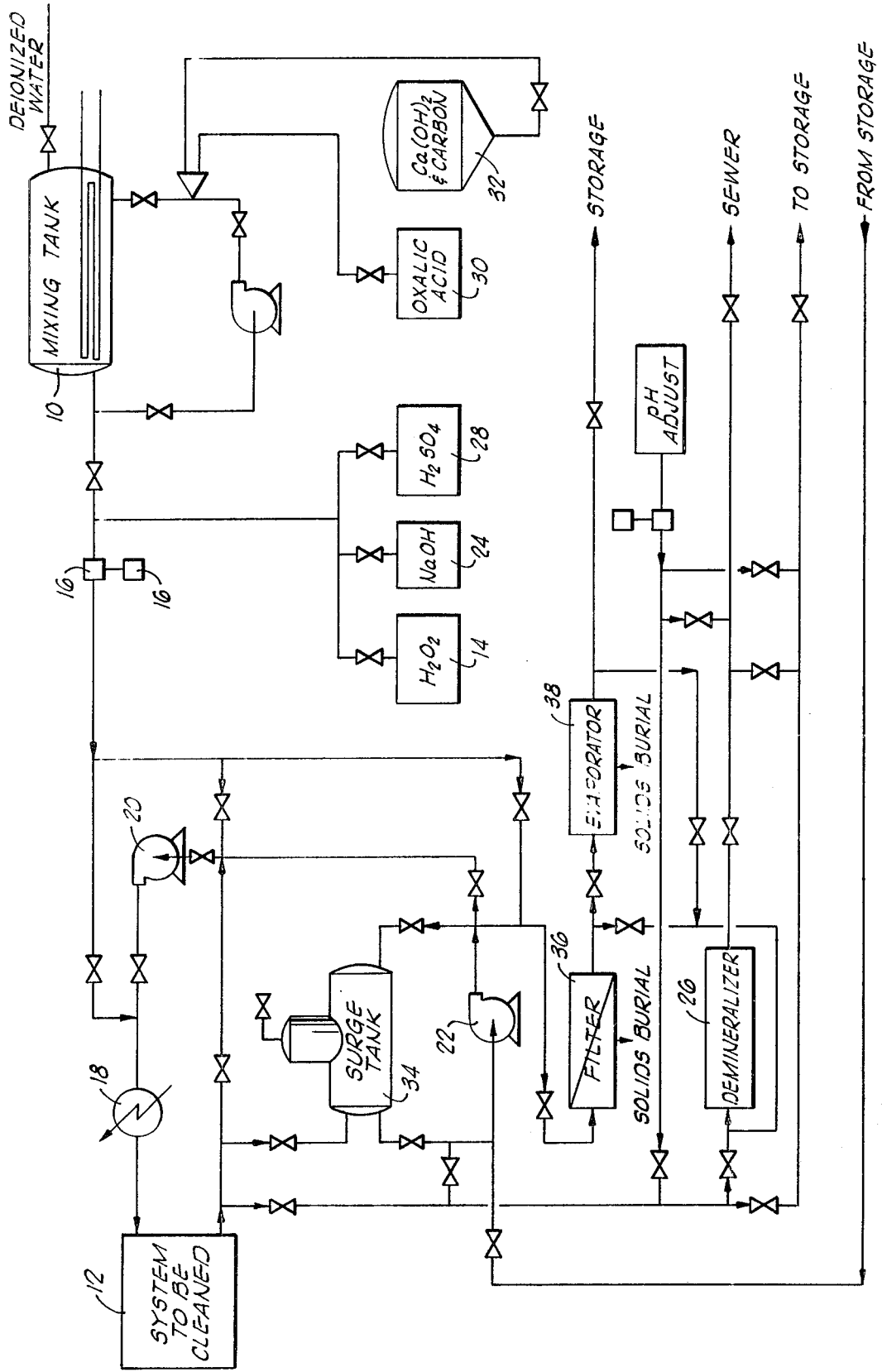

PROCESS FOR CLEANING RADIOACTIVELY CONTAMINATED METAL SURFACES

This invention relates to a process for cleaning metal surfaces which carry radioactive scale, such as may be encountered, for example, on nuclear reactor internal metal surfaces which are continuously exposed to water circulating in the reactor system.

Nuclear energy is rapidly increasing in importance as a source of power. Large nuclear power plants are now in operation, and have proved to be economically attractive. Production of power by nuclear means is accompanied by production of radiation. During the course of operation of a nuclear power plant, there is a continuous buildup of radioactivity within the primary system. Corrosion products and scale producing solutes and solids entrained in the circulating cooling water are radioactively activated by passage of the water through the intense neutron flux in the reactor core. These radioactive products are then deposited on the internal metal surfaces of the reactor system. In stainless steel primary systems, the thin scaly deposits can be described as iron-chromium-nickel spinels, and these deposits have been very difficult to remove.

Over an extended period of operation, the level of radioactivity of the scale deposits increases to the point where operating personnel are endangered, and a periodic system cleaning and decontamination is necessary to obviate this hazard. Procedures for reactor decontamination and cleaning have been developed and used in cleaning nuclear reactors with varying degrees of success. A continuing need exists, however, for better and faster procedures for removing radioactive scale from such systems.

The present invention provides an improved process for cleaning ferrous metal surfaces by the removal of radioactive scale deposits therefrom. A specially useful application of the invention is in the cleaning and decontamination of water-contacted metallic surfaces in the primary system of nuclear power plants. Broadly described, the method of this invention is, in its most basic form, a two step cleaning and decontamination procedure in which the surface is first contacted with an oxidizing solution to pre-condition the adhered scale to change it so that the decontamination solution next used can easily dissolve the coating. Since the preferred decontamination and scale removal solution used in the second step is a mixture of sulfuric and oxalic acids, it is preferred that the oxidizing solution used as a pre-conditioning material function effectively in conjunction with this specific acid solution used in the next step. Alkali metal permanganate and hydrogen peroxide are examples of suitable oxidizing solutions, with the hydrogen peroxide solution being preferred.

The decontamination and cleaning solution used in the second step of the process is a mixture of a mineral acid with a complexing agent which will develop an acid soluble complex with the pre-treated scale deposits on the metal. A mixture of sulfuric acid and oxalic acid is preferred, and when used, desirably contains a suitable corrosion inhibitor. In the decontamination step, the acid solution is circulated in contact with the metal at elevated temperatures for a period sufficient to remove the scale.

In addition to the basic two step procedure described, the invention preferably also includes a third step which can be described as water treatment and disposal of contaminants. In this step, the effluent acidic cleaning solution is transferred to a processing area where it is chemically treated to convert dissolved radionuclides to insoluble precipitates or precipitated metal scavenging agents. The chemical treatment can typically entail addition of an alkaline earth hydroxide to yield insoluble alkaline earth salts, or the addition of alkali metal permanganate to produce manganese sulfate and manganese dioxide which can then be precipitated by making the spent cleaning solution basic. The precipitated solids, which contain a major portion of the radioactivity, are then removed by filtration or other suitable means from the cleaning solution, and can be buried in suitable shielded containers or otherwise safely disposed of.

The process of the present invention provides a method which requires much less cleaning solution than previously proposed methods, and the time required for cleaning and the expense thereof are greatly reduced. The method also allows the handling and disposal of the radioactive solid wastes to be much faster and more easily accomplished than has been achieved in previously used methods.

An important object of the invention is to provide a process by which radioactive scale can be faster, more completely and more economically removed from metallic surfaces.

Another object of the invention is to provide a method for cleaning metallic surfaces carrying a radioactive scale, in which method the radioactive treating solutions produced are more quickly and easily decontaminated.

A further object of the invention is to provide a procedure for removing radioactive scale from metallic surfaces wherein the scale is dissolved in the cleaning solution, rather than being removed as a suspension of solid materials.

Additional objects and advantages of the invention will become apparent from the following detailed description of preferred embodiments of the invention when read in conjunction with the accompanying drawing, which drawing is a schematic process flow diagram illustrating the practice of one embodiment of the invention.

In the initial step of the process of the invention, the contaminated metal to be cleaned is pre-treated by contact with an oxidizing solution to convert the components of the scale to a form susceptible to removal by the acidic decontamination solution later used. Several oxidizing compositions can be used with varying degrees of effectiveness, and these compositions include, for example, aqueous solutions of hydrogen peroxide, alkali metal permanganate compounds, nitric acid, sodium persulfate and sodium bromate contacted with the surface to be cleaned.

A preferred oxidizing composition is an aqueous solution of hydrogen peroxide. When this material is used in conjunction with the preferred decontamination solution, hereinafter described in detail, the decontamination result obtained is accompanied by an unexpectedly low rate of corrosion of the ferrous metal structural materials. Moreover, the excess hydrogen peroxide can be very easily destroyed in situ by catalysis and/or heating after its oxidizing function is performed, so that the aqueous solvent can then be used in making up the acidic decontamination solution used in the next step of the process. The destruction of the hydrogen peroxide is catalyzed by manganese metal, present in many steel alloys, such as 304 stainless steel, and such steels are frequently the ferrous metals to be cleaned by the process of the invention. When the preferred hydrogen peroxide solution is used for pretreatment of the metal, an approximately 0.5 weight percent solution is now considered to be the operative lower limit herein; there is no known high concentration limit; however, a solution having a hydrogen peroxide concentration in excess of 20 weight percent is considered hazardous. A 1 weight percent to 5 weight percent solution can be readily employed in commercial applications. Preferably, a 2 weight percent solution is utilized.

The metal to be treated is contacted by the oxidizing solution at a temperature effective to rapidly oxidize the metals in the scale contaminants to their high valence states. The temperature must not, however, reach or exceed that at which the oxidizing agent undergoes rapid decomposition. In the case of the preferred hydrogen peroxide solution, a temperature of from about 90°F to about 150°F can be effectively employed, and the most preferred temperature of contact is from about 120°F to about 135°F. The time of contact can vary widely, depending upon the extent of scaling of the metal, the temperature employed and the particular oxidizing solution used. In general, however, a contact time of from about 1 hour to about 5 hours will be utilized, and in the case of the preferred hydrogen peroxide oxidant, a contact time of two hours is most suitable.

After the pre-conditioning oxidizing solution has contacted the metal for the described time period, it is removed from the system in preparation for the introduction of the cleaning or decontaminating solution. As previously mentioned, an advantage realized through the use of hydrogen peroxide is that this material can be decomposed in situ quite easily, and its water solvent then used in making up the acidic decontaminating solution. Decomposition of the hydrogen peroxide in stainless steel manganese containing systems can be achieved merely by heating the solution to a temperature in excess of about 160°F, or in other systems, by heating after first making the solution basic, or by catalysis using manganese dioxide.

After removal of the oxidizing pre-treatment solution from contact with the metal, the acidic decontamination solution is made up and circulated into contact with the metal. In a closed system, and where hydrogen peroxide has been utilized in pre-treatment, this step is particularly easily effected, because after destruction or decomposition of the hydrogen peroxide, the acidic cleaning solution can be made up by merely adding the required acidic components to the water which is already in place. In general, the acids useful in the formulation of the decontamination solution are mixtures of mineral acids with complexing agents. For example, aqueous solutions of mixtures of either sulfuric acid or nitric acid, or both, with oxalic, citric or formic acid (as complexing materials) will function with varying degrees of effectiveness to remove and dissolve radioactive scale previously conditioned with the oxidizing solution as hereinbefore described. An effective amount of a corrosion inhibiting material is also preferably added to the aqueous acid solution to maintain corrosion of the metallic surface within acceptable limits. Suitable corrosion inhibitor compounds include, for example, ferric sulfate, ferric nitrate, nitric acid, diorthotolyl thiourea and phenyl thiourea.

A decontamination solution which has been found to be especially effective in the practice of the process of the invention is an aqueous solution containing from about 1 weight percent to about 10 weight percent sulfuric acid, and from about 1 weight percent to about 5 weight percent oxalic acid. Although much higher concentrations of the sulfuric and oxalic acids can be used in the decontamination solution, there is no advantage in terms of the effectiveness of scale removal or the rate at which such scale is removed, and there is, in fact, a disadvantage when subsequent disposal of the large quantities of radioactive wastes then recovered from the treating solution is considered. In most instances, it will be further desirable to incorporate an effective amount of a corrosion inhibitor compound in this preferred acidic decontamination solution.

The preferred decontamination solution is one which contains from about 2 weight percent to about 7 weight percent sulfuric acid, and from about 1 weight percent to about 4 weight percent oxalic acid, with the most effective and economical concentrations of the two acids being 4 weight percent sulfuric acid, and 2 weight percent oxalic acid. A commercially available corrosion inhibitor sold under the tradename Rodine 71-11 is preferably included in the system, and the amount of this material utilized in the decontaminating solution is from about 0.005 weight percent to about 0.05 weight percent, with about 0.01 weight percent being preferred.

The decontamination of the metal, and removal of the radioactive scale therefrom, is carried out by circulating the decontamination solution in contact with the metal at an elevated temperature. Preferably, the temperature at which the metal is contacted by the acid solution exceeds about 180°F. A temperature of contact of about 205°F has been found to be especially suitable. The time of maintaining contact of the metal by the decontamination solution will, of course, vary widely according to the extent of scaling, the strength of the acid solution used and the temperature of contact. In general, however, a contact time in excess of 20 hours is desirable, and in most instances, a contact time between 24 and 60 hours will be employed most effectively.

Upon completion of the decontamination treatment by contact with the acidic solution, the system is drained (where a closed system is being cleaned), or the acid cleaning solution is removed from contact with the metal. In the course of removal, or following removal to a remote location, the effluent, being concentrated in dissolved radionuclides, is treated to precipitate or scavenge the metallic constituents from solution, and with them, remove from the solution substantially all of the radioactive components thereof. In the waste treatment procedure, the objective is to decontaminate the spent acid solution by removal, as disposable solids, of dissolved metals therefrom, and concurrently, of essentially all of the radionuclides.

In the present invention, this objective is accomplished by addition of a stoichiometric excess of a composition selected from the group consisting of alkaline earth oxides, alkaline earth hydroxides, and an alkali metal permanganate followed by a pH adjusting basic material. Of these several treatments, two methods of treatment of the spent acid cleaning solution have been found to be preferred. The first and most suitable of these is the addition of calcium hydroxide in an amount slightly exceeding the amount required to neutralize the sulfuric and oxalic acid, to thereby produce calcium sulfate and calcium oxalate which are precipitated from the solution, and carry with them a majority of the metallic constituents of the solution and most of the radioactivity. Where the preferred 4 weight percent sulfuric acid — 2 weight percent oxalic acid cleaning solution is used, about 0.5 pound of lime will be added per gallon of spent acid effluent.

In the second of the preferred methods of treating the spent radioactive acid solution, potassium permanganate is added to the solution, usually in an amount of from about 0.1 pound to about 0.3 pound per gallon of the spent decontamination solution, depending upon the original acid concentration and the amount of radioactive scale removed. The permanganate reacts with and destroys the oxalic acid with the production of manganese dioxide and manganese sulfate. Sodium hydroxide, calcium hydroxide or other suitable base, is then added to the solution to neutralize the sulfuric acid, and to raise the pH to at least 9, and preferably 10 or higher. At this pH level, manganese dioxide and manganese sulfate form precipitates which settle from the solution, and in doing so, substantially remove the radioactive material from solution. The sulfates and other dissolved solids can then be recovered from the filtrate by evaporation to substantially further reduce the radioactivity of the condensate recovered from the evaporation.

The two preferred waste treatment processes described above can each be operated either as a continuous process or as a batch process. Of the two, the lime process is preferred, since it involves fewer steps and is easier to control. The solids recovered in any process of treating the radioactive spent cleaning solution are highly radioactive, and are disposed of by conventional methods of disposing of such wastes, such as by burial in shielded containers. Where an organic corrosion inhibitor or wetting agent is used in the acid decontamination solution, activated charcoal is added to the spent solution to adsorb the corrosion inhibitor from the solution. In general, about five pounds of activated charcoal are added per gallon of the organic additive used in the acid cleaning solution. It is also generally desirable to add a filter aid material at the time of adding the precipitate yielding reagents to speed the rate of solids recovery by filtration.

In some cases, where the lime treatment is used, the level of radioactivity and solids content of the filtrate after filtration is sufficiently low to permit this liquid effluent to be discharged into sewers or other available drainage systems. Further reduction in the level of radioactivity of the liquid can be effected by either (a) passing the neutralized solution through an ion exchange type demineralizer to take out additional radionuclides, or (b) evaporating the solution to recover additional solids, and then discharging the condensate, or if desired, passing it through a demineralizer.

As a final step which is desirably incorporated in the process of the invention in most cleaning situations, the cleaned and decontaminated metal is rinsed once, and preferably at least twice, with demineralized water, and the rinse water then passed through a demineralizer.

The process of the invention will be further clarified by reference to the accompanying drawing which schematically illustrates a preferred process flow arrangement useful in practicing the invention. Initially, demineralized water is pumped from a chemical mixing tank 10 to the system 12 to be cleaned, and enroute, the hydrogen peroxide pre-treating solution is injected from a storage container 14 into the water by injection pumps 16. The hydrogen peroxide solution is passed through a heat exchanger 18 where it is heated to a temperature of about 125°F prior to entering the contaminated system 12. The oxidizing solution is circulated through the system for a period of about two hours by means of one of the circulating pumps 20 or 22, or by both of them. The temperature of the solution is thereafter elevated to at least 160°F and up to about 200°F by means of the heat exchanger 18. In nonmanganese containing systems, at a time just prior to or concurrent with the previously described temperature elevation, demineralized water, charged with sodium hydroxide from a source 24, is injected into the system in a quantity sufficient to elevate the pH of the circulating peroxide solution to at least 10. This effects the decomposition of the hydrogen peroxide.

The water remaining can be used in making up the acid decontamination and cleaning solution. Where this is done, about one-third of the total circulating water is drained from the system 12 through the demineralizer 26, and can then be stored or discharged to a sewer or the like. The removed one-third of the total circulating water is then made up by an equivalent amount of inhibited acid solution formulated by blending sulfuric acid containing corrosion inhibitor from storage tank 28 with oxalic acid from storage tank 30. The blending can be effected in the mixing tank 10. The sulfuric acid-oxalic acid-inhibitor mixture is heated either in the mixing tank 10 or heat exchanger 18, or both, to a temperature of from about 190°F to about 210°F and injected into the system 12 in which it is circulated until the system is cleaned. For best results, the temperature in system 12 is maintained in the range of 190°F to 210°F during the decontamination step.

After the system has been cleaned by substantially complete scale removal, drainage of the system is commenced via the surge tank 34. A slurry of calcium hydroxide and activated carbon from storage 32 in water mixed therewith in tank 10 is then injected into the spent effluent acid solution. The treated effluent is held in the surge tank for a period of about 1 minute to allow adequate time for the lime-acid reaction to proceed to completion. In an alternate procedure, storage tank 32 can contain permanganate and activated carbon in lieu of calcium hydroxide and activated carbon.

The resulting slurry is then pumped through the filter 36 where the precipitated, highly radioactive solids are removed and subsequently disposed of by burial. The filtrate can be either disposed of in the sewer by dilution when appropriate, or evaporated in the evaporator 38 to remove additional solids and sufficiently decontaminate the water to facilitate its re-use or safe disposal, or the filtrate can alternatively (or additionally) be passed after neutralization through the demineralizer (ion exchange device) 26 to further remove radioactive materials. The demineralized water can be discharged to a sewer or stored for re-use. As the final step, demineralized water from storage 44 is circulated through the system several times on two successive occasions to provide two rinses of the system. After each rinse, the rinse water is again passed through the demineralizer 26 prior to disposal.

The following examples will serve to further illustrate the principles of the invention and its advantages.

EXAMPLE 1A

In a processing arrangement of the type shown in the drawing, 4,500 gallons of hydrogen peroxide are initially injected into 85,000 gallons of demineralized water, and the solution is heated to 125°F before charging to the system to be cleaned. The peroxide solution is circulated in the system at this temperature for a period of about two hours. The pre-treatment oxidizing solution is then heated to increase its temperature to about 180°F, and the circulating solution is maintained at this temperature for a period of about five minutes so that the hydrogen peroxide is destroyed.

After destruction of the hydrogen peroxide, 30,000 gallons of the circulating water are drained through an ion exchange device to remove radioactive ion species present, and the deionized or demineralized water is then passed to storage.

Seven hundred fifty (750) pounds of phenylthiourea corrosion inhibitor are blended into 30,000 pounds of 98 weight percent sulfuric acid, and the thus inhibited acid is injected into the water circulating in the system to be cleaned. 15,000 pounds of oxalic acid are added to the circulating solution. The thus formulated cleaning and decontaminating solution is heated to a temperature of 205°F, and circulation is continued for a period of 48 hours. The system is then drained, and in the course of drainage, a waste treating slurry is injected into the discharging effluent. The slurry contains 47,000 pounds of calcium hydroxide and 2,700 pounds of activated carbon in 7,200 gallons of water. This slurry is added to the discharging effluent in an amount such that approximately ½ pound of lime is added to each gallon of effluent.

When the addition of the slurry to the effluent has been completed, the effluent is held in a reaction zone, such as the surge tank 34, for a period of from 1 to 5 minutes. The radioactive slurry developed by the precipitation of calcium sulfate and calcium oxalate is then pumped through the filter 36 to remove substantially all of the precipitated solids. The solids are disposed of by burial or other suitable means. The filtrate is evaporated to a relatively low level to recover additional solids from solution, and these are also buried. The condensate from the evaporation process is passed through the demineralizer 26 and then sent to storage for re-use. After completion of the waste treatment, or even concurrently therewith, the system to be cleaned is rinsed several times, using demineralized water.

EXAMPLE 1B

The pre-treatment and decontamination steps described in Example 1A are repeated. To the discharging effluent (spent acid decontaminating solution) are then added 13,500 pounds of potassium permanganate and 2000 pounds of activated charcoal slurried in 7,200 gallons of gelled water, to which slurry 28,000 pounds of sodium hydroxide has been added to impart a pH to the treated slurry of 10. 420 pounds of a filter aid material are also added to the system. 0.15 pound of the slurry is added for each gallon of effluent.

After holding the mixture quiescent for about a minute to permit all the manganese dioxide and manganese sulfate to precipitate, the solids are removed by filtration, and the filtrate is further purified by evaporation and demineralization.

EXAMPLE 2

Test coupons are made by cutting with a non-ferrous abrasive wheel, segments of 304 stainless steel piping removed from a nuclear reactor system. The internal (water carrying) surface of the pipe is the surface to be cleaned and carries a thin, dark red tenacious coating. In the tests, the coupons are immersed in mildly stirred treating and decontaminating solutions.

In a first test, a 2 weight percent hydrogen peroxide solution is used for pre-treatment, and in a second test, 3 weight percent of hydrogen peroxide is used. Both pretreatments are carried out at 125°F. The decontamination treatment is effected in each run using an aqueous solution containing 4 weight percent sulfuric acid, 2 weight percent oxalic acid and 0.01 weight percent of Rodine 71-11, a commercially available corrosion inhibitor, with the solution heated to 205°F. The time of contact with the decontamination solution is 23 hours in the case of each test.

In the test using 2 weight percent hydrogen peroxide for pre-treatment, the initial level of radioactivity of the exposed surface is 12 milliroentgens, and the final radioactivity after treatment is 0.7 milliroentgen. The coupon used in the 3 weight percent hydrogen peroxide test has an initial radioactivity level of 20 milliroentgens, and this is reduced by treatment to 1.2 milliroentgens. Both of the test solutions are clear at the end of the test. The results obtained indicate that both the 2 and 3 weight percent solutions of hydrogen peroxide, when used in conjunction with the described sulfuric-oxalic acid solution containing corrosion inhibitor, and used at 205°F, are effective to remove the contaminating scale carried on the exposed surface of the coupons.

EXAMPLE 3

Two 304 stainless steel coupons are prepared as described in Example 2. Prior to the pre-treatment and decontamination treatment, one of the coupons has an initial radioactivity level of 9 milliroentgens, and the other a level of 8.4 milliroentgens. The coupons are immersed in a 2 percent hydrogen peroxide solution at a temperature of 125°F for a period of two hours. After this time, one of the coupons (9 mr. initial radiation value) is removed, and is immersed in a decontamination solution heated to a temperature of 190°F and containing 1.5 percent sulfuric acid and 1.5 percent oxalic acid. Contact with the stirred decontamination solution is maintained for 24 hours. The final level following the 24 hour contact period with the decontamination solution is 0.08 milliroentgen.

The second coupon (8.4 mr. initial radiation value) is immersed in a decontamination solution containing 3 weight percent sulfuric acid and 1.5 weight percent oxalic acid. This solution is also heated to 190°F. After 24 hours of treatment, the radiation level is reduced to 0.1 milliroentgen. Both decontamination solutions are considered to be satisfactorily effective in reducing the level of contamination.

EXAMPLE 4

In another series of tests, two coupons are prepared as described in Example 2, and pre-treated with 2 percent hydrogen peroxide in the manner described. One of the coupons is then decontaminated with an acid solution which contains 1.5 weight pecent sulfuric acid and 1.5 weight percent oxalic acid. The second coupon is decontaminated with a second acid solution which contains 2 weight percent sulfuric acid and 2 weight percent oxalic acid. The coupon decontaminated by the use of the 1.5 weight percent sulfuric — 1.5 weight percent oxalic acid solution is reduced in radioactivity level from an initial value of 24.5 milliroentgens to a final radiation level, after 27 hours of treatment, of 0.2 milliroentgen. Where the 2 weight percent sulfuric — 2 weight percent oxalic acid solution is used, an initial radioactivity level of 27 milliroentgens is reduced to a final level of 0.2 milliroentgen in the same 27 hour period.

EXAMPLE 5

In order to obtain a better understanding of the rate at which decontamination occurs in acid solutions of varying strength, coupons prepared in the manner described are first treated with 2 percent hydrogen peroxide in the manner previously described. The pre-treated coupons are then immersed in two different acid decontamination solutions. The first of these solutions contains 2 weight percent sulfuric acid and 2 weight percent oxalic acid. The radioactivity of a coupon immersed in this solution after the pre-treatment with 2 percent hydrogen peroxide solution is 50 milliroentgens. The other of the two coupons is immersed in an acidic decontamination solution containing 4 weight percent sulfuric acid and 2 weight percent oxalic acid. The initial contamination of this coupon is 52 milliroentgens. Both decontaminations were carried out at a temperature of 205°F.

In Table I, the results of periodic measurements of the radioactivity level of the two coupons is set forth. It will be perceived that the rates at which the coupons are decontaminated are substantially equal for the two types of acid solutions used.

TABLE I

Acid Solution - 2 Wt. Percent $H_2SO_4$ - 2 Wt. Percent Oxalic

| Time | Radioactivity |
|---|---|
| Initial | 50 mr. |
| 8 hrs. | 2.1 mr. |
| 21 hrs. | 0.3 mr. |
| 29 hrs. | 0.15 mr. |

Acid Solution - 4 Wt. Percent $H_2SO_4$ - 2 Wt. Percent Oxalic

| Time | Radioactivity |
|---|---|
| Initial | 52 mr. |
| 8 hrs. | 2.5 mr. |
| 21 hrs. | 0.9 mr. |
| 29 hrs. | 0.2 mr. |

EXAMPLE 6

In evaluating various procedures for cleaning and decontaminating ferrous metals which have been subjected to nuclear radiation, a criterion used for evaluating the effectiveness of the method employed is referred to as the decontamination factor, or DF. The decontamination factor is the ratio of the radioactivity level of the metal prior to decontamination, divided by the radioactivity level of the metal after decontamination.

A comparative test is made utilizing a preferred embodiment of the process of the present invention and several heretofore employed cleaning procedures. In the procedure of the present invention employed, 2 weight percent hydrogen peroxide pre-treating solution is utilized, followed by decontamination using an aqueous solution of 7 weight percent sulfuric acid and 3 weight percent oxalic acid. A decontamination factor of 68 is realized. Using a previously proposed cleaning and decontamination procedure in which the same type of metallic coupons are subjected to pre-treatment with potassium permanganate, followed by cleaning and decontamination with a mixture of ammonium citrate and oxalic acid, a decontamination factor of 8 is obtained. The same decontamination factor is realized when a process is utilized in which pre-treatment is carried out using ammonium persulfate, followed by decontamination with a solution containing a mixture of hydroxyacetic acid and formic acid. The decontamination factors for the compositions employed in Example 5 above are 333 for the system 2 percent $H_2SO_4$ — 2 percent oxalic acid, and 260 for the system 4 percent $H_2SO_4$ — 2 percent oxalic acid.

EXAMPLE 7

A contaminated coupon prepared in the manner hereinbefore described is subjected to pre-treatment with an aqueous solution containing 3 weight percent potassium permanganate and 10 weight percent sodium hydroxide for a period of 2 hours at a temperature of 212°F. The coupon is then immersed in a decontamination solution containing 4 weight percent sulfuric acid, 2 weight percent oxalic acid and 0.01 weight percent of Rodine 71-11 commercially available corrosion inhibitor. The coupon thus treated has an initial contamination of 12 milliroentgens, and after 23 hours of contact with the acid solution, has a radioactivity of 0.03 milliroentgens. A decontamination factor of 400 is thus obtained.

EXAMPLE 8

Coupons of 304 stainless steel are prepared for corrosion testing by degreasing the coupons in acetone and then scrubbing with a soap pad, followed by rinsing with water and drying with acetone. The coupons are weighed to the nearest 0.1 milligram on an analytical balance. In one test, a coupon is first pre-treated by contact with 2 weight percent hydrogen peroxide solution for a period of 2 hours at a temperature of 125°F. This coupon is then placed in a non-metallic corrodent circulation system and corroded by circulating, at a temperature of 190°F and a circulation velocity of 6 feet per second, an aqueous acid solution containing 4 weight percent sulfuric acid, 2 weight percent oxalic acid and 0.01 weight percent commercially available Rodine 71-11 corrosion inhibitor. Contact is maintained for a period of 24 hours, after which the coupon is removed, cleaned of any adherent corrosion products and reweighed. A corrosion rate of less than 0.001 lbs/ft²/day is determined. Additional corrosion tests carried out in the same way with the hydrogen peroxide pre-treatment, but extended to periods of 48 hours and 60 hours, do not show any increase in the coupon corrosion rate.

The 24 hour corrosion test is then repeated, except that the hydrogen peroxide pre-treatment is eliminated. In this test, a corrosion rate of 0.018 lbs/ft²/day is observed. The corrosion tests, collectively considered, thus show that pre-treatment with the peroxide solution significantly enhances the effectiveness of the corrosion inhibitor in the acidic decontamination solution.

EXAMPLE 9

To further examine the effect of pre-treatment with hydrogen peroxide on the overall decontamination results, two coupons prepared as described in Example 2 are initially pre-treated prior to utilizing a 4 weight percent sulfuric — 2 weight percent oxalic acid decontamination solution containing 0.1 weight percent phenyl thiourea as a corrosion inhibitor. In the pre-treatment of one of the coupons, the coupon is contacted with a 5 weight percent hydrogen peroxide solution for a period of 2 hours at a temperature of 125°F prior to cleaning the coupon with the described acid decontamination solution at a temperature of 190°F for a period of 46½ hours. The coupon is clean, radioactivity is substantially reduced, and no significant corrosion of the coupon occurs. The second coupon is decontaminated in the same way with the same acid solution, but is pre-treated using only distilled water for a period of 2 hours at 125°F. After 25 hours of acid decontamination treatment, the decontaminant solution has a deep blue color indicating severe corrosion of the metallic substrate.

EXAMPLE 10

Tests are run upon two contaminated stainless steel coupons in which one of the coupons is pre-treated with a 2 weight percent hydrogen peroxide solution, followed by a decontamination treatment using an aqueous solution containing 4 percent sulfuric acid, 2 percent oxalic acid and 0.01 percent of Rodine 71-11 commercially available corrosion inhibitor (all weight percents). The decontamination is carried out for a period of 60 hours. The identical test conditions are utilized with the second coupon, except the hydrogen peroxide pre-treatment is eliminated. The coupon which is not pre-treated with the hydrogen peroxide has a black coloration and the solution is blue as evidence of corrosion. A decontamination factor of 290 is obtained using the 60 hour treatment. Where hydrogen peroxide pre-treatment is carried out in the manner described on the first coupon, the coupon remains bright throughout the test, and a decontamination factor of 360 is obtained.

EXAMPLE 11

Radioactively contaminated stainless steel coupons are subjected to decontamination treatment with various aqueous acidic decontamination solutions, and without benefit of pre-treatment with any oxidizing solution. Each test solution and coupon are placed in a 180 ml electrolytic beaker closed by a Teflon gasket perforated for a stirrer, thermometer, thermister probe and sampling port. A heating tape is used in conjunction with a hot plate for temperature control. Each decontamination test is run for a period of 24 hours, and in each test, 100 ml of decontamination solution is used for each square inch of contaminated coupon tested. The radioactivity of each coupon tested is measured prior to the test and following the test. The results of these tests are set forth in Table II.

TABLE II

| Test | Acidic Decontamination Solution, Wt. Percent | T, °F | Initial Radioactivity, mr. | Final Radioactivity, mr. |
| --- | --- | --- | --- | --- |
| 1 | 21 percent $H_3PO_4$ | 150 | 19 | 12 |
| 2 | 2 percent citric acid, 10 percent ammoniated ethylenediamine tetracetic acid, 1 percent hydrazine and 0.005 percent corrosion inhibitor | 180 | 26 | 19 |
| 3 | 10 percent glycolic acid, 5 percent oxalic acid, and 0.005 percent corrosion inhibitor | 200 | 21 | 8 |
| 4 | 4 percent $H_2SO_4$, 2 percent oxalic acid and 0.1 percent phenyl thiourea (corrosion inhibitor) | 185 | 18 | 1.2 |
| 5 | 10 percent $H_2SO_4$, 5 percent oxalic acid and 0.1 percent phenyl thiourea (corrosion inhibitor) | 185 | 17 | 1.2 |

The results set forth in Table II confirm that the sulfuric acid-oxalic acid system gives superior decontamination results, and further indicate that there is no advantage gained in the rate or extent of the decontamination by use of higher concentrations of sulfuric acid and oxalic acid in the decontamination solution.

The foregoing examples of the practice of the present invention will provide a guide to those skilled in the art enabling them to practice the invention. It is to be understood, however, that the specific examples herein set forth, and the specific chemicals and process parameters dealth with in detail in the application, are not intended to be limiting with respect to the basic principles of the invention and the way in which they may be utilized in practicing the invention. Changes and innovations in reactants employed and process parameters which continue to rely upon the basic principles underlying the invention are therefore considered to be within the spirit and scope of the invention, except as the same may be necessarily limited by the appended claims or reasonable equivalents thereof.

What is claimed is:

1. A process for cleaning radioactively contaminated ferrous metal surfaces with aqueous solutions, and removing the radioactive materials therefrom, comprising:

contacting the metal surface with an aqueous solution containing an oxidizing agent to pre-condition the contaminants on the metal surface, and facilitate their removal in acid solution;

contacting the metal surface with a mixture of an aqueous solution of mineral acid and a complexing agent at a temperature of at least about 180°F to dissolve the scale carried on the metal; then removing the spent mineral acid solution from contact with the metal surface; and adding to the spent acid solution, a material selected from the group consisting of (a) an alkali metal permanganate followed by a pH adjusting basic compound, (b) alkaline earth oxides and (c) alkaline earth hydroxides to form with solutes of the spent acid solution, precipitatable compounds; and precipitating solid compounds from the acid solution to remove a major portion of the raioactive materials therefrom.

2. A process as defined in claim 1 wherein said aqueous solution containing an oxidizing agent consists essentially of an aqueous solution containing from about 1 weight percent to about 5 weight percent hydrogen peroxide.

3. A process as defined in claim 2 wherein the aqueous hydrogen peroxide solution is contacted with the metal surface at a temperature of from about 90°F to about 150°F.

4. The process defined in claim 2 wherein said aqueous solution containing an oxidizing agent contains about 2 weight percent hydrogen peroxide.

5. A process as defined in claim 2 wherein said contact of the metal surface with oxidizing agent is carried out for a period of from about 1 hour to about 5 hours, and following such contact, the hydrogen peroxide is destroyed by heating the hydrogen peroxide solution to a temperature of at least 160°F at a pH of at least 9.

6. A process as defined in claim 1 wherein said mixture of mineral acid and complexing agent consists essentially of an aqueous solution containing from about 1 weight percent to about 10 weight percent sulfuric acid, and from about 1 weight percent to about 7 weight percent oxalic acid.

7. The process defined in claim 6 wherein said mixture of mineral acid and complexing agent includes an effective amount of a ferrous metal corrosion inhibiting compound.

8. A process as defined in claim 7 wherein said aqueous solution containing an oxidizing agent consists essentially of an aqueous solution containing from about 1 weight percent to about 5 weight percent hydrogen peroxide.

9. A process as defined in claim 8 wherein said mixture of mineral acid and complexing agent consists essentially of an aqueous solution containing about 4 weight percent sulfuric acid and about 2 weight percent oxalic acid.

10. A process as defined in claim 8 wherein the material added to the spent acid solution is calcium hydroxide in an amount at least sufficient to neutralize all sulfuric acid and all oxalic acid in said spent acid solution.

11. A process as defined in claim 10 and further characterized in including the steps of rinsing the metal surface with demineralized water after removing the spent mineral acid from contact with the metal surface.

12. The process defined in claim 6 wherein said mixture of mineral acid and complexing agent consists essentially of about 4 weight percent sulfuric acid and about 2 weight percent oxalic acid.

13. The process defined in claim 6 wherein the metal surface is contacted with said aqueous acid solution at a temperature of about 205°F.

14. The process defined in claim 6 wherein the metal surface is contacted with said aqueous acid solution for a period of at least 20 hours.

15. A process as defined in claim 1 wherein the material added to the spent acid solution is calcium hydroxide.

16. A process as defined in claim 1 and further characterized in the step of rinsing the metal surface with demineralized water after removing the spent mineral acid from contact with the metal surface.

17. A process as defined in claim 1 wherein the metal cleaned is a 304 stainless steel.

18. The process defined in claim 1 wherein the material added to the spent acid solution is potassium permanganate and an amount of alkali metal hydroxide effective to adjust the pH of the spent acid solution and the added potassium permanganate to at least 10.

19. A process as defined in claim 1 wherein said aqueous solution containing an oxidizing agent contains potassium permanganate as the oxidizing agent.

20. A process for cleaning radioactivity contaminated ferrous metal surfaces comprising:

contacting the metal surface with an aqueous solution containing from about 1 weight percent to about 5 weight percent hydrogen peroxide at a temperature of from about 90°F to about 150°F for a period of at least 1 hour;

ceasing contacting the metal surface with hydrogen peroxide;

contacting the metal surface with an aqueous acidic solution containing from about 1 weight percent to about 10 weight percent sulfuric acid and from about 1 weight percent to about 7 weight percent oxalic acid and a ferrous metal corrosion inhibitor compound at a temperature of at least 180°F and for a period of at least 20 hours; and removing the aqueous acidic solution from contact with the metal surface.

21. A process as defined in claim 20 wherein contact of the metal surface with hydrogen peroxide is ceased by elevating the pH and heating the aqueous solution of hydrogen peroxide to decompose the hydrogen peroxide.

22. A process as defined in claim 20 wherein said aqueous hydrogen peroxide solution contains about 2 weight percent hydrogen peroxide.

23. A process as defined in claim 22 wherein said aqueous acidic solution contains about 4 weight percent sulfuric acid and about 2 weight percent oxalic acid.

24. A process as defined in claim 23 wherein the metal surface is contacted with the aqueous hydrogen peroxide solution at a temperature of about 125°F, and is contacted with the aqueous acidic solution at a temperature of about 205°F.

25. A process as defined in claim 20 wherein said aqueous acidic solution contains about 4 weight percent sulfuric acid and about 2 weight percent oxalic acid.

26. A process as defined in claim 20 wherein the metal surface is contacted with the aqueous acidic solution at a temperature of about 205°F.

27. A process as defined in claim 20 wherein the metal surface is contacted with the aqueous hydrogen peroxide solution at a temperature of about 125°F.

* * * * *